Patented Mar. 3, 1936

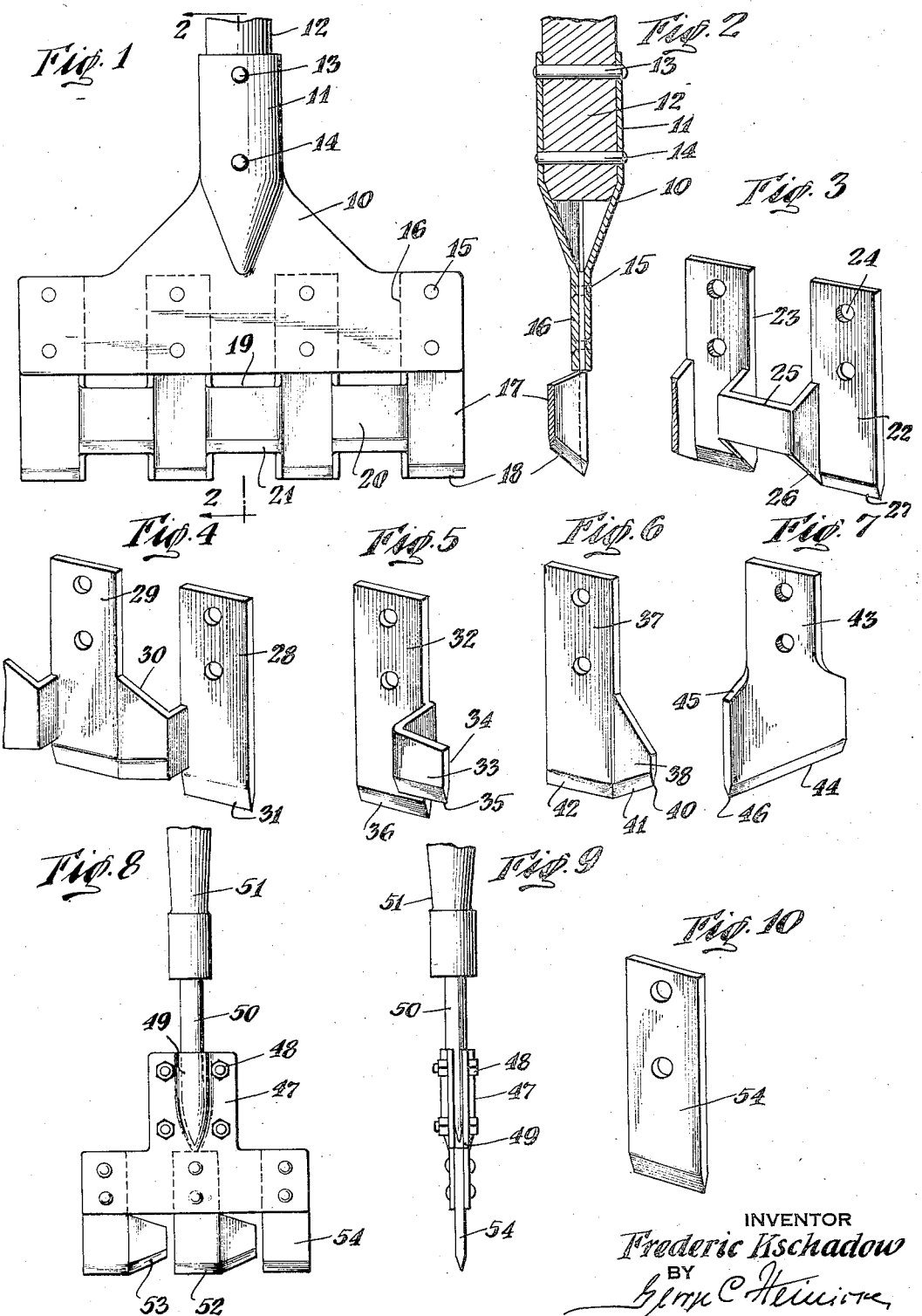

2,032,757

UNITED STATES PATENT OFFICE 2,032,757

ICE REMOVING TOOL

Frederic Kschadow, New York, N. Y.

Application March 8, 1935, Serial No. 9,928

1 Claim. (Cl. 262—10)

My invention relates to improvements in tools for the removal of ice and frozen snow or the like from pavements, side-walks, etc., and it is the principal object of my invention to provide a handy tool having an interrupted cutting edge by arranging gaps between the individual scraper blades or cutting implements into which gaps straight or inclined blades extend so that it is possible with my improved tool to positively chip off, remove or scrape off any coating of ice from a surface without injuring the same by holding the tool by its handle at a suitable angle.

Another object of my invention is the provision of a tool of the above character which is equipped with ice remover blades of various forms which may readily be attached or removed from their heads equipped with suitable handles.

A further object of my invention is the provision of a tool for removing ice or frozen snow or the like which is adapted to be connected or combined with suitable handles or head pieces, and which may also equally well be used for crushing or shaving ice.

A still further object of my invention is the provision of a tool of the type described above having exchangeable, multiple, steel implements and being of a simple, and therefore comparatively inexpensive construction, yet durable and highly efficient in use.

These and other objects and advantages of my invention will become more fully known as the description thereof proceeds, and will then be more specifically defined in the appended claim.

In the accompanying drawing forming a material part of this disclosure:

Fig. 1 shows in front elevation a tool for removing ice constructed according to my invention.

Fig. 2 is a section on line 2—2 of Figure 1.

Fig. 3 is a perspective view of a form of blade used with my ice removing tool.

Figs. 4, 5, 6, and 7 illustrate modified forms of blades suitable for use with my tool.

Fig. 8 is a fragmentary front elevation of a modified form of handle and blade for an ice removing tool according to my invention.

Fig. 9 is a side elevation thereof.

Fig. 10 is a detail view of a blade to be used with any of my tools, principally for crushing and shaving ice.

As illustrated in Figures 1 and 2, a head 10 of any suitable shape, has formed therewith a socket 11 for the reception of a handle, preferably made of wood and secured to the socket by means of bolts 13, 14 or the like.

To the lower widened part of the head are attached, as at 15, the upper end plates 16 of a plurality of scraper blades or similar tools 17 having lower bevelled and sharpened cutting or scraping edges 18. The individual blades are spaced from one another, as at 19, and in the spaces between each two of such blades, similar, but shorter blades 20 are provided or made integrally with the tools 17, having sharp lower edges 21.

As shown in Figure 3 two adjoining blades of a plurality of such blades on one tool, are designated 22, 23 and adapted to be attached to a common head by suitable fastening means passed through the openings 24. The blades are spaced from one another and connected by members 25, each of substantially U-shaped cross-section, and the side branches of the U are bevelled at their lower ends to form sharp cutting edges 26 cooperating with the lower cutting edges 27 of the blades 22 and 23.

In Figure 4, I have shown another form of cutters according to which two adjoining blades 28, 29 of a plurality of such blades on one tool, are spaced from one another, and connected by a member 30 which is substantially L-shaped in cross-section, and the lower edges of the L member are also sharpened and co-operate with the cutting edges 31 of the blades 28, 29.

In the form of my invention illustrated in Figure 5, I have shown a cutter blade with which is integrally formed an auxiliary cutter member 33 angularly disposed to blade 32, and having substantially V-shape in cross-section, and provided with a plurality of sharp cutting edges 34 and 35 while the cutting edge of blade 32 is designated 36.

As shown in Figure 6, the cutter blade 37 has formed therewith an auxiliary blade 38 forming an obtuse angle with the blade 39 and also provided with suitable cutting edges 40, 41 co-operating with the cutting edge 42 of the blade 37.

In Figure 7 another modified form of cutter blade 43 is shown having an obliquely disposed lower cutting edge 44, and having one of its side edges near its lower end bent out of the plane of blade 43, as at 45. The lower cutting edges 44 of the blade and of the bent out member meeting at a sharp point, as at 46.

In the modified forms illustrated in Figures 8 and 9, the head 47 of the tool is made in two parts bolted together as at 48 and having formed therewith a socket 49 composed of two halves supplementing one another for the reception of the staff 50 of a metal handle 51 formed integral therewith.

A plurality of cutter blades 52 are attached to the head and have each in the spaces separating the blades a laterally extending sharp edged scraper blade 53, while the outer blade 54 may be obliquely arranged.

In operation, according to circumstances, I may use one or the other of the blades combined with the heads and the handles, and it will be clear that by engaging the cutting edges of the tools at the angle required by the nature of the work to be performed and suitably handling the tool, the cutters will loosen the ice layer on a pavement and remove the same and break the loosened pieces and crush the same, the spaces between the single blades allowing a deep penetration into the layer of ice and separation of the individual parts thereof. The tool made on a smaller scale may also advantageously be used as ice pick, crusher or shaver.

It will be understood that I have described and shown the preferred forms of my invention only as some examples of the many possible ways to practically construct the same and that I may make such changes in the general arrangement of the tool and in the construction of the minor details thereof as come within the scope of the appended claim without departure from the spirit of my invention or the principles involved.

Having thus described my invention, what I claim as new and desire to secure by Letters Patent is:

In a tool of the character described, a plurality of interchangeable cutter blades spaced from one another, and smaller, cutter members of substantially L-shaped cross-section in the spaces between each two of the blades integral therewith, and a plurality of cutting edges formed with said blades and members.

FREDERIC KSCHADOW.